(12) United States Patent
Pham

(10) Patent No.: US 10,181,192 B1
(45) Date of Patent: Jan. 15, 2019

(54) BACKGROUND MODELLING OF SPORT VIDEOS

(71) Applicant: CANON KABUSHIKI KAISHA, Tokyo (JP)

(72) Inventor: Quang Tuan Pham, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 15/640,110

(22) Filed: Jun. 30, 2017

(51) Int. Cl.
G06T 7/20 (2017.01)
G06T 7/194 (2017.01)
G06T 7/90 (2017.01)

(52) U.S. Cl.
CPC ............. G06T 7/194 (2017.01); G06T 7/90 (2017.01)

(58) Field of Classification Search
CPC .................................. G06T 7/194; G06T 7/90
See application file for complete search history.

(56) References Cited

U.S. PATENT DOCUMENTS

| | | | | |
|---|---|---|---|---|
| 7,574,043 B2* | 8/2009 | Porikli | ............... | G06K 9/346 382/103 |
| 2003/0103647 A1* | 6/2003 | Rui | ............... | G06K 9/00234 382/103 |
| 2005/0063566 A1* | 3/2005 | Beek | ............... | A61B 5/0059 382/115 |
| 2005/0276446 A1 | 12/2005 | Chen et al. | | |
| 2007/0133880 A1* | 6/2007 | Sun | ............... | G06K 9/38 382/195 |
| 2010/0177969 A1* | 7/2010 | Huang | ............... | H04N 21/64322 382/224 |
| 2011/0273620 A1* | 11/2011 | Berkovich | ............... | G06T 5/002 348/584 |
| 2013/0129205 A1* | 5/2013 | Wang | ............... | G06K 9/6278 382/164 |
| 2014/0270501 A1* | 9/2014 | Emeott | ............... | G06T 7/90 382/165 |
| 2015/0339828 A1* | 11/2015 | Djelouah | ............... | G06T 7/0087 382/173 |

OTHER PUBLICATIONS

Stauffer, et al.,"Learning Patterns of Activity Using Real-Time Tracking", IEEE Transactions on Pattern Analysis and Machine Intelligence, Aug. 2000, vol. 22, p. 747-757.

* cited by examiner

Primary Examiner — David F Dunphy
(74) Attorney, Agent, or Firm — Canon USA, Inc. I.P. Division

(57) ABSTRACT

A method of classifying foreground and background in an image of a video by determining a pitch color model of the image, the pitch color model comprising a pitch color, color shades of the pitch color, and the pitch color and the color shades under different shades of shadow. Then determining a pitch mask based on a pitch segmentation of the image of the video, determining a pitch background model based on the pitch mask and the pitch color model. The method may continue by classifying each of the elements of the pitch mask as background if a color of the element of the pitch mask matches the pitch color model and updating the pitch background model and the pitch color model using the colors of the elements that have been classified to match the pitch color model.

20 Claims, 10 Drawing Sheets

BACKGROUND MODELLING OF SPORT VIDEOS

FIELD OF INVENTION

The present disclosure relates to video segmentation and, in particular, to a method, apparatus and system for modelling a sporting scene. The present disclosure also relates to a computer program product including a computer readable medium having recorded thereon a computer program for modelling a sporting scene.

DESCRIPTION OF BACKGROUND ART

A video is a sequence of images. The images may also be referred to as frames. The terms 'frame' and 'image' are used interchangeably throughout this specification to describe a single image in an image sequence, or a single frame of a video.

An image is made up of pixels where each pixel is represented by one or more values representing the visual properties at that pixel. For example, in one scenario three (3) values are used to represent Red, Green and Blue colour intensity at the pixel. In another scenario, YCbCr values are used to represent the luma component and the chroma components at the pixel.

Scene modelling, which covers both background modelling and foreground modelling, involves modelling visual content of a scene, based on an image sequence depicting the scene. A usage of scene modelling is foreground segmentation by background subtraction. Foreground segmentation may also be described by its inverse (i.e., background segmentation). Examples of foreground segmentation applications include activity detection, unusual object or behaviour detection, and scene analysis.

Foreground segmentation allows a video analysis system to distinguish between transient foreground objects and the non-transient background, through scene modelling of the non-transient background, and a differencing operation between that background and incoming frames of video. Foreground segmentation can be performed by using scene modelling and identifying portions of the modelled scene which are either moving, or recently changed/added, or both.

To model a scene captured by a video camera, for example, the content of a captured image is often divided into one or more visual elements, and a model of the appearance of each visual element is determined. A scene model may maintain a number of models for each visual element location, each of the maintained models representing different modes of appearance at each location within the scene model. Each of the models maintained by a scene model is known as "mode model" or "scene model". For example, there might be one mode model for a visual element in a scene with a light being on, and a second mode model for the same visual element at the same location in the scene with the light off.

The description of a mode model may be compared against the description of an incoming visual element at the corresponding location in an image of the scene. The description may include, for example, information (e.g., average intensity value, variance value, appearance count of the average intensity value, etc.) relating to pixel values or DCT coefficients. If the description of the incoming visual element is similar to one of the mode models, then temporal information about the mode model, such as age of the mode model, helps to produce information about the scene. For example, if an incoming visual element has the same description as a very old visual element mode model, then the visual element location can be considered to be established background. If an incoming visual element has the same description as a young/recent visual element mode model, then the visual element location might be considered to be background or foreground depending on a threshold value. If the description of the incoming visual element does not match any known mode model, then the visual information at the mode model location has changed and the location of the visual element can be considered to be foreground.

Depending on the scene modelling method, a visual element can refer to a single pixel, an M×N block of pixels or a group of connected pixels (also known as a superpixel). The visual element location can refer to the location of a single pixel, or the location of the top-left corner of each M×N block of pixels or the centroid location of the group of connected pixels. The description of the visual element may contain but not be limited to the average colour intensities observed at the visual element, and/or a set of texture measures around the visual element. In general, any set of features computed over the visual element can be used to describe the visual element.

Scene modelling maintains a number of mode models per visual element; each corresponding to a description of the visual element. Some of these mode models describe the non-transient part of the scene, also known as the background. Other mode models describe the transient part of the scene, also known as the foreground. A dynamic scene modelling method also updates these mode models using the visual properties of incoming images. This updating step ensures the scene model is up to date with the dynamic changes happening in the scene including but not limited to illumination changes, or permanent changes to the background content such as addition, removal or one-off movement of fixed objects.

In one scene modelling method, a mixture of Gaussian (MoG) modes is used to describe the intensity values at each pixel. Each Gaussian in the mixture is represented by an average $\mu$, a standard deviation $\sigma$ and a mixture weight $\omega$. The mixture weight $\omega$ is proportional to the frequency of appearance of the corresponding intensity mode. The sum of all mixture weights for each MoG equals to one. At each pixel location, the incoming intensity is matched to all Gaussians in the mixture. If the distance between the incoming intensity I and the Gaussian mode is within $2.5\sigma$ (standard deviation) of a Gaussian distribution $|I-\mu|\leq 2.5\sigma$, the incoming intensity is said to match the Gaussian mode. The incoming intensity I is then used to update all matched modes, where the amount of update is inversely proportional to how close I is to the mode average $\mu$. This update scheme, which updates multiple modes at a time, is inefficient and can potentially bring two modes closer to each other to a point where the two modes have similar averages. Such converged modes result in waste of memory due to mode duplication. In general, three to five Gaussian modes are used to model a scene depending on scene dynamics. If each mode requires the three parameters ($\mu$, $\sigma$, $\omega$) in double-precision format, 9 to 15 floating-point values are required by the MoG in total for the respective 3 to 5 Gaussian modes. Traditional MoG background modelling methods also do not distinguish moving cast shadow from foreground pixels. Moving cast shadow from players in a sporting scene, for example, has similar frequency of appearance as the foreground players. As a result, the moving cast shadow is often classified as foreground. This may not be desirable in certain applications like player segmentation and tracking.

To handle shadow in background subtraction, some prior art methods use a weak shadow model to further distinguish shadow from foreground pixels. The scene is still modelled using a MoG scene modes as the traditional MoG methods. However, when an input colour I (colour intensities of R, G and B) satisfies a weak shadow model criteria with respect to an expected background colour BG at the same pixel:

$$\text{angle}(I, BG) < T_{angle} \quad (1)$$

$$T_{ratio1} < |I|/|BG| < T_{ratio2} \quad (2)$$

the input colour I is re-classified as shadow, not foreground. By enforcing a small angle in the RGB colour space between the two colours I and BG, the weak shadow model defines a conic regions around the line connecting the origin (R,G,B)=(0,0,0) and the expected background colour (R,G,B)=$(R_B, G_B, B_B)$ with a conic angle of $T_{angle}$ (e.g., $T_{angle}$=0.1 radian) The ratio of magnitude |I|/BG is limited between two thresholds $T_{ratio1}$ and $T_{ratio2}$ (e.g., $T_{ratio1}$=0.4 and $T_{ratio2}$=0.95) to present too dark or too bright colours with respect to the expected background colour being classified as shadow. The magnitude ratio |I|/|BG| is also referred to as the luminance ratio or luminance distortion, and the colour angle angle(I,BG) is related to the chrominance distortion used by other similar prior art for shadow detection. The weak shadow model is based on an observation that the shadow colour is a darker version of the same colour. While it is correct that the luminance of shadow is lower than that of the lit colour, there may also be a chromatic shift between the two colours. A common example is outdoor shadow on a clear sunny day, where the lit colours appear warm from the red hot sun and the shadow colours appear cool from the blue sky. This colour shift from warm to cool as a surface goes from fully lit to fully shaded is referred to as the chroma shift. A strong chroma shift can bring a shadow colour outside the conic region defined by the weak shadow model.

To better handle shadow in background modelling, one prior art method models shadow explicitly using extra MoG shadow modes. The scene is still modelled using a MoG scene modes as the traditional MoG methods. However, when an input colour I satisfies a weak shadow model criteria with respect to an expected background colour BG at the same pixel, the input colour I is used to update the MoG shadow modes. Once both the scene MoG and shadow MoG are established at every pixel, a shadow flow is computed for each background colour as the difference between the background colour and its corresponding shadow colour. A shadow flow lookup table is then constructed and maintained for every seen RGB colours. This shadow flow can model the chromatic shift due to different coloured light sources. However, to build this shadow flow lookup table takes a long time with double memory requirement compared to traditional MoG background modelling methods. The shadow flow lookup table cannot model background colours that were not previously seen by the MoG scene and shadow modes. As the illumination condition changes, as happens with sun movement during the day, previously computed shadow flow may no longer be correct.

None of the above-mentioned MoG scene modelling methods can handle moving cast shadow with a small memory and computational footprint. This is because they all aim to model a general scene. To improve the performance of background modelling for sport videos, domain knowledge such as similar sized players on a large homogeneous coloured playing field should be used. Hence, there is a need for a specialised scene modelling method specifically designed for sport videos which has relatively low storage and computation cost but high foreground and shadow segmentation accuracy.

SUMMARY OF THE INVENTION

It is an object of the present invention to substantially overcome, or at least ameliorate, one or more disadvantages of existing arrangements.

In an aspect of the present disclosure, there is provided a method of classifying foreground and background in an image of a video, said method comprising:

determining a pitch colour model of the image, the pitch colour model comprising a pitch colour, colour shades of the pitch colour, and the pitch colour and the colour shades under different shades of shadow;

determining a pitch mask based on a pitch segmentation of the image of the video;

determining a pitch background model based on the pitch mask and the pitch colour model;

classifying each of the elements of the pitch mask as background if a colour of the element of the pitch mask matches the pitch colour model; and updating the pitch background model and the pitch colour model using the colours of the elements that have been classified to match the pitch colour model.

In another aspect of the present disclosure, there is provided an apparatus of classifying foreground and background in an image of a video, the apparatus comprising:

a processor;

a memory coupled to the processor, the memory storing instructions for execution by the processor to perform the steps of:

determining a pitch colour model of the image, the pitch colour model comprising a pitch colour, colour shades of the pitch colour, and the pitch colour and the colour shades under different shades of shadow;

determining a pitch mask based on a pitch segmentation of the image of the video;

determining a pitch background model based on the pitch mask and the pitch colour model;

classifying each of the elements of the pitch mask as background if a colour of the element of the pitch mask matches the pitch colour model; and updating the pitch background model and the pitch colour model using the colours of the elements that have been classified to match the pitch colour model.

In yet another aspect of the present disclosure, there is provided a non-transitory computer readable medium comprising a computer program stored on the medium for classifying foreground and background in an image of a video, the computer program comprising:

code for determining a pitch colour model of the image, the pitch colour model comprising a pitch colour, colour shades of the pitch colour, and the pitch colour and the colour shades under different shades of shadow;

code for determining a pitch mask based on a pitch segmentation of the image of the video;

code for determining a pitch background model based on the pitch mask and the pitch colour model;

code for classifying each of the elements of the pitch mask as background if a colour of the element of the pitch mask matches the pitch colour model; and code for updating the pitch background model and the pitch colour model using the colours of the elements that have been classified to match the pitch colour model.

Other aspects of the present disclosure are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1:
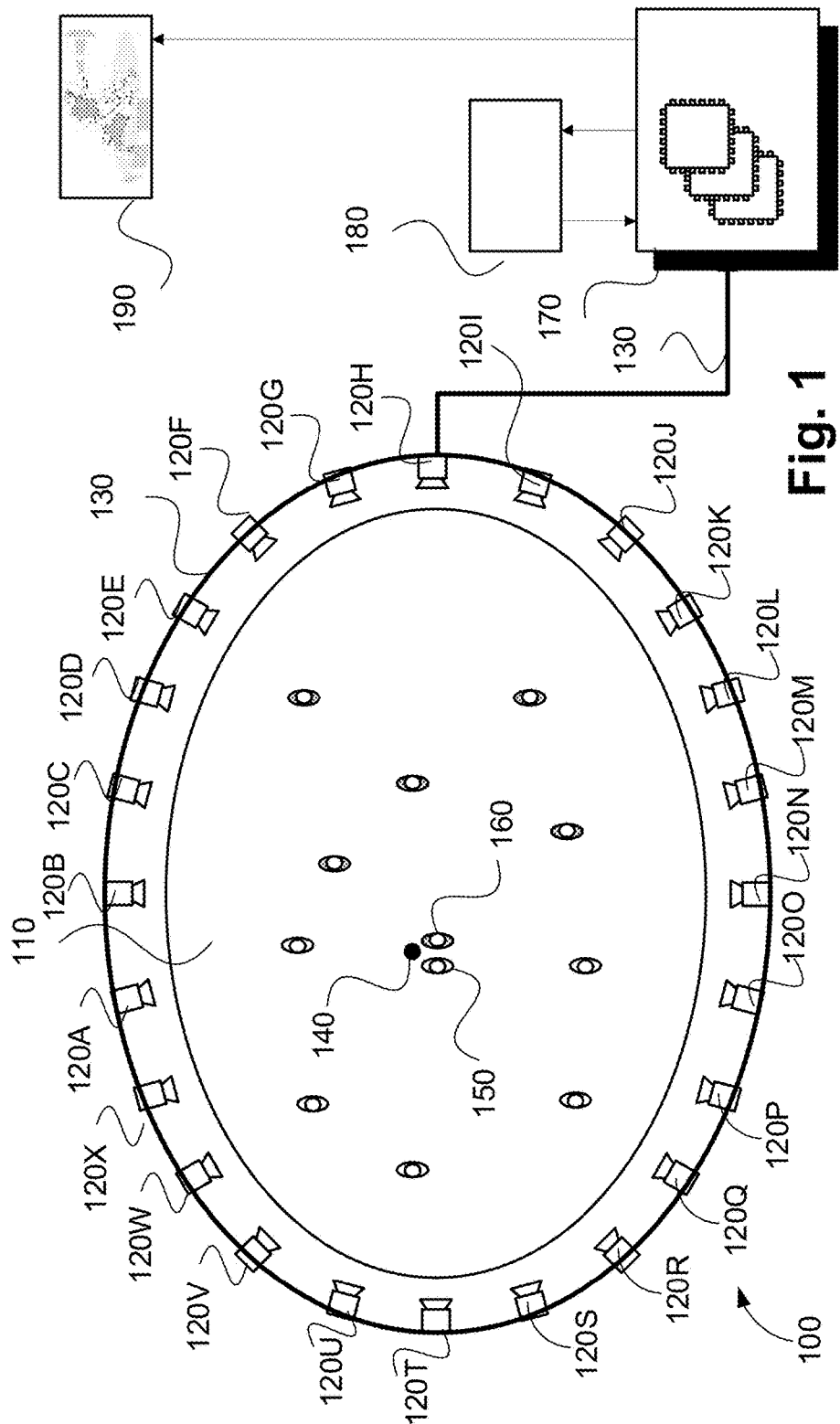
FIGS. 1, 2A and 2B collectively form a schematic block diagram representation of a camera system upon which described arrangements can be practiced.

Where reference is made in any one or more of the accompanying drawings to steps and/or features that have the same reference numerals, those steps and/or features have for the purposes of this description the same function (s) or operation(s), unless the contrary intention appears.

A computer-implemented method of modifying a scene model is described below. The modified scene model may then be used in processing a video comprising a plurality of images.

The video may be captured using a network of cameras. The network of cameras may be set up around a region of interest (ROI), to capture live images of a scene within the ROI for broadcast. As described, the network of cameras may be part of a large computer vision system used to generate free viewpoint video (FVV). The FVV system is capable of processing video in real time and generating virtual video footage of the scene suitable for broadcast with a low latency.

The cameras may surround the ROI, for example, in one or more rings of cameras at different heights. The cameras may be evenly spread around the ROI or there may be a larger density of cameras at particular locations. Alternatively, the locations may be randomly spread. The cameras may be limited to locations on one side of the ROI, or limited due to the physical surrounding of the ROI.

As described below, the cameras are mounted and fixed. However, in alternative arrangements the cameras may be capable of pan, tilt and zoom (PTZ) and may be hand held and mobile. In order to produce FVV, the system may require either stabilised frames from the captured video or accurate calibration data associated with each frame. The data associated with each frame may include the effect of any temporal variation (e.g., white balance) in the camera capture. Such temporal variation in the camera capture may be either controlled (e.g. by an operator or some kind of automated control system) or may be due to mechanical or optical instability in a camera. The instability may include lens expansion/compression, vibrations, hand shake, or slow drifts such as due to environmental changes such as temperature, air pressure, wind, crowd motion, etc.

For example, a sports venue or stadium may have a large number of cameras (e.g., ten (10) or more cameras, or a hundred (100) or more cameras) with fixed PTZ directed towards a playing area. The playing area is often approximately rectangular, circular or oval, allowing the playing area to be surrounded by one or more rings of cameras so that all points on a field within the playing area are captured simultaneously from a large number of viewpoints. In some arrangements, a full ring of cameras may not be employed but rather some subset(s) of the full perimeter of cameras may be used. An arrangement where one or more subsets of the full perimeter of cameras are used may be advantageous when certain viewpoints are known to be unnecessary ahead of time.

As described below, the cameras are synchronised to acquire frames at the same instants in time. The cameras may be roughly set up at different heights (e.g. in three (3) rings at different heights) and may focus on specific preselected areas of the playing field. In one arrangement, the image features used for stabilisation may be line like field markings. The stabilisation methods being used should be robust to dynamic occlusions such as players moving on the field and crowd movements in stands surrounding the playing fields. The stabilisation methods should also handle periodic structures like parallel line markings.

In an alternative arrangement, the network of cameras described above may be configured to capture images of a stage at a performance venue. For example, a set of ten or more cameras may be directed in towards the stage from various directions in front of a performance. In such a stage arrangement, challenges may include changing scenery or equipment on the stage. The features in such a stage arrangement may be more varied than in a sports venue.

The cameras used in the camera network may be traditional live broadcast type cameras, digital video cameras, surveillance cameras, or other devices with imaging capability such as a mobile phone, tablet, computer with webcam, etc. As described below, methods described below are used for processing high definition (HD) video frames. However, all the methods described can be adapted to other frame formats such as standard definition (SD), 4K or 8K.

As described above, the described methods are adapted for use in the context of a sports or similar performance arena, such as arena 110 shown in FIG. 1. The arena 110 has an oval playing field, and is surrounded by a ring of cameras 120A-120X. Each of the cameras 120A-120X is physically located at a respective predetermined location with respect to the arena 110. The arena 110, in the example of FIG. 1, contains players from a first team (e.g. 150) and a second team (e.g. 160) and a ball 140. In the example of FIG. 1, the player 150 may be represented by a first object, the player 160 may be represented by a second object and the ball 140 by a third object.

Video frames captured by a camera, such as the camera 120A, are subject to processing and temporary storage at or near the camera 120A prior to being made available via a network connection 130 to a video processing unit 170. The video processing unit 170 receives controlling input from controller 180 that specifies the position of a virtual camera within the arena 110. The role of the video processing unit 170 is to synthesize a specified camera viewpoint 190 based on the video streams available to the video processing unit 170 from the cameras 120A-120X surrounding the arena 110.

The virtual camera position input may be generated by a human virtual camera operator and be based on input from a user interface device such as a joystick, mouse or similar controller including dedicated controllers comprising multiple input components. Alternatively, the camera position may be generated fully automatically based on analysis of game play. Hybrid control configurations are also possible where some aspects of the camera positioning are directed by a human operator and others by an automated algorithm. For example, coarse positioning may be performed by a human operator and fine positioning, including stabilisation and path smoothing, may be performed by an automated algorithm.

The video processing unit 170 may be configured to achieve frame synthesis using any suitable image based rendering method. In addition to rendering a requested frame, the video processing unit 170 may be additionally configured to perform synthesis, in-painting or interpolation of regions as required to create frames of high quality visual appearance. The video processing unit 170 may also be configured to provide feedback in the form of the frame quality or the completeness of camera coverage for the requested viewpoint so that the device generating the camera position control signal can be aware of the practical bounds of the video processing unit 170. Video streams created by the video processing unit 170 may be subsequently provided to a production desk where the video streams can be edited together to form a broadcast video.

Figure 2A:
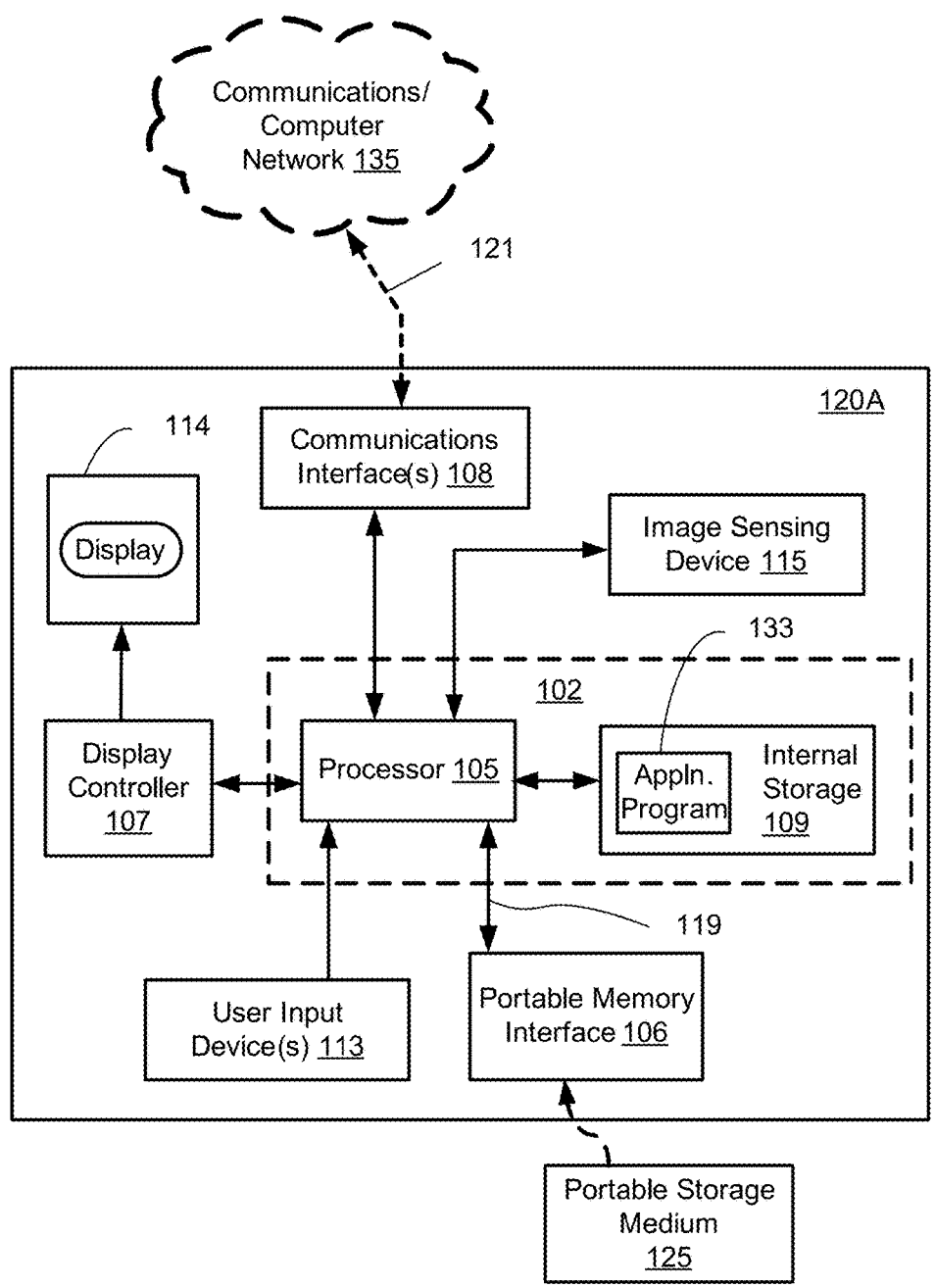
Figure 2B:
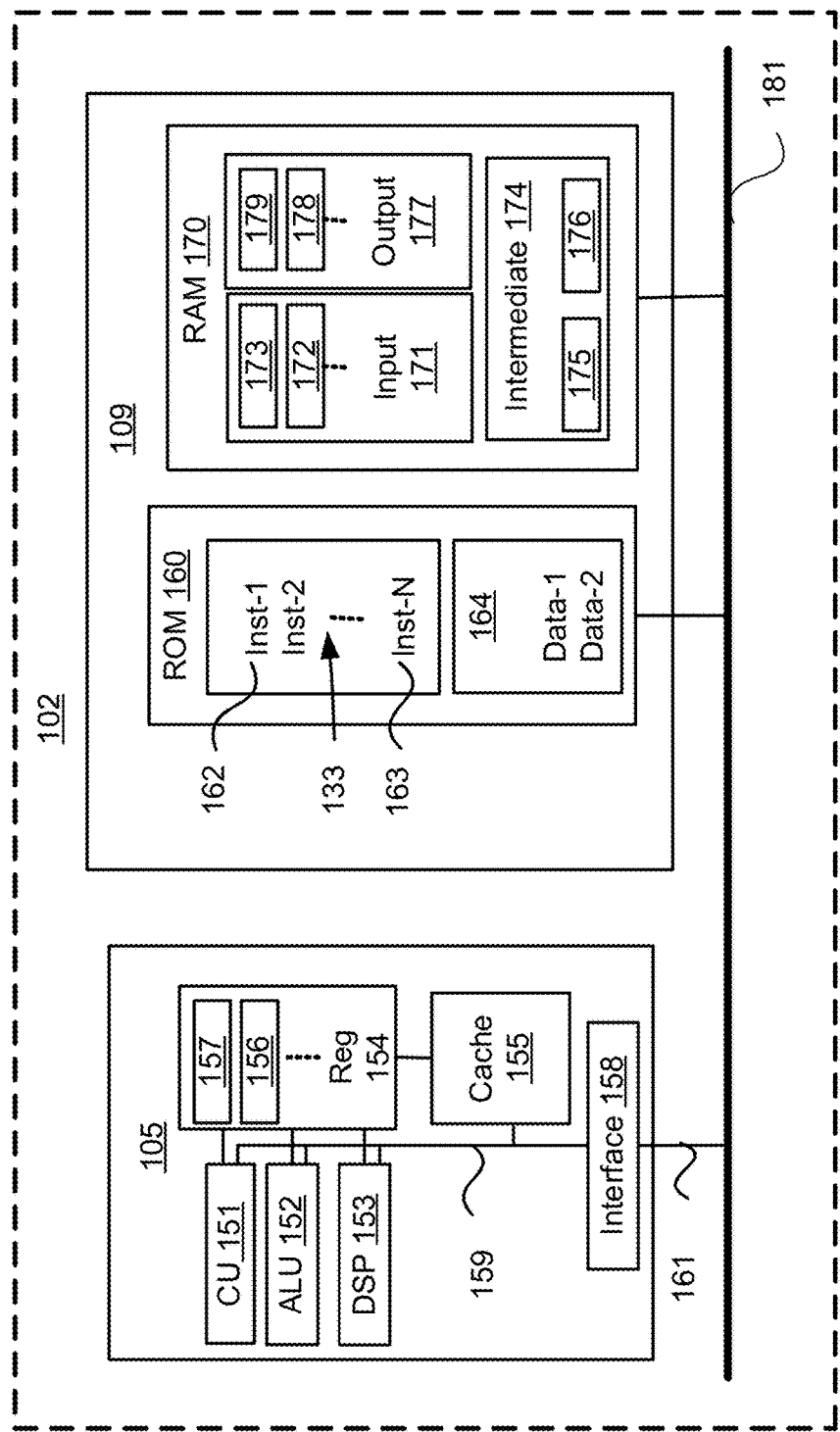

FIGS. 2A and 2B collectively form a schematic block diagram of a camera system forming the camera 120A. The other cameras 120B to 120X have a similar configuration to the camera 120 and, as such, will not be explicitly described.

The camera 120A includes embedded components, upon which methods of modifying a scene model to be described are desirably practiced. The camera 120A may be any suitable apparatus such as, for example, a digital camera or a mobile phone, in which processing resources are limited. One advantage of analysis at or near to the camera 120A, for example, is the potential for reduced latency. Nevertheless, the methods to be described may also be performed on higher-level devices such as desktop computers, server computers, and other such non-local processing unit devices with significantly larger processing resources.

Although the methods described below are described as being implemented on the camera 120A, the methods may be implemented on any one or more of the cameras 120B to 120X.

The camera 120A is used to capture input images representing visual content of a scene appearing in the field of view (FOV) of the camera 120A. Each image captured by the camera 120A comprises a plurality of visual elements. A visual element is defined as an image sample. In one arrangement, the visual element is a pixel, such as a Red-Green-Blue (RGB) pixel. In another arrangement, each visual element comprises a group of pixels. In yet another arrangement, the visual element is an 8 by 8 block of transform coefficients, such as Discrete Cosine Transform (DCT) coefficients as acquired by decoding a motion-JPEG frame, or Discrete Wavelet Transformation (DWT) coefficients as used in the JPEG-2000 standard. The colour model is YUV, where the Y component represents luminance, and the U and V components represent chrominance.

As seen in FIG. 2A, the camera 120A comprises an embedded controller 102. In the present example, the embedded controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 2B. The RAM 170 may be volatile, non-volatile or a combination of volatile and non-volatile memory.

The camera 120A includes a display controller 107, which is connected to a display 114, such as a liquid crystal display (LCD) panel or the like. The display controller 107 is configured for displaying graphical images on the display 114 in accordance with instructions received from the controller 102, to which the display controller 107 is connected.

The camera 120A also includes user input devices 113 which are typically formed by a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 2A, the camera 120A also comprises a portable memory interface 106, which is coupled to the processor 105 via a connection 119. The portable memory interface 106 allows a complementary portable memory device 125 to be coupled to the camera 120A to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera 120A also has a communications interface 108 to permit coupling of the camera 120A to a computer or communications network 135 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the controller 102, in conjunction with an image sensing device 115, is provided to perform the functions of the camera 120A. The image sensing device 115 may include a lens, a focus control unit and an image sensor. In one arrangement, the sensor is a photo-sensitive sensor array. As another example, the camera 120A may be a mobile telephone handset. In this instance, the image sensing device 115 may also represent those components required for communications in a cellular telephone environment. The image sensing device 115 may also represent a number of encoders and decoders of a type including Joint Photographic Experts Group (JPEG), (Moving Picture Experts Group) MPEG, MPEG-1 Audio Layer 3 (MP3), H.264 (MPEG-4 Part 10 Advanced Video Coding) and the like. The image sensing device 115 captures an input image and provides the captured image as an input image.

The methods described below may be implemented using the embedded controller 102, where the processes of FIGS. 3 to 5 may be implemented as one or more software application programs 133 executable within the embedded controller 102. The camera 120A of FIG. 2A implements the described methods. In particular, with reference to FIG. 2B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 may be pre-installed and stored in the ROM 160 by a manufacturer, prior to distribution of the camera 120A. However, in some instances, the application programs 133 may be supplied to the user encoded on one or more CD-ROM (not shown) and read via the portable memory interface 106 of FIG. 1 prior to storage in the internal storage module 109 or in the portable memory 125. In another alternative, the software application program 133 may be read by the processor 105 from the network 135, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera 120A. Examples of transitory or non-tangible computer readable transmission media that may also participate in the provision of software, application programs, instructions and/or data to the camera 120A include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 2A. Through manipulation of the user input device 113 (e.g., the keypad), a user of the camera 120A and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the camera 120A is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the camera 120A. Typically, the application program 133 waits for events and subsequently executes the block of code associated with that event. Events may be triggered in response to input from a user, via the user input devices 113 of FIG. 2A, as detected by the processor 105. Events may also be triggered in response to other sensors and interfaces in the camera 120A.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the camera 120A.

A dynamic scene typically contains a fixed background and occasionally some moving objects in the foreground. The segmentation of these foreground objects from a background model is a task that is required by many applications. Most video analytics applications, for example, analyse the information about the foreground objects including but not limited to their sizes, shapes, moving directions, speeds, motion patterns and interactions. The segmented foreground and background model are also used by visualisation applications such as free-viewpoint video to synthesize new view.

Foreground segmentation from a video is often achieved using background modelling, or more generally, scene modelling, where the appearances of both the background (BG) and foreground (FG) are modelled. A multi-mode scene model, for example, models the captured intensities of a scene from a video using multiple modes at each pixel (or other visual element such as DCT block, superpixel, etc.). Each mode corresponds to a frequently occurring intensity at that pixel (e.g., the intensity of a static background), a couple of intensities from a dynamic background texture (waving tree, ripple water, etc.), or the intensity of foreground objects passing by.

Figure 3:
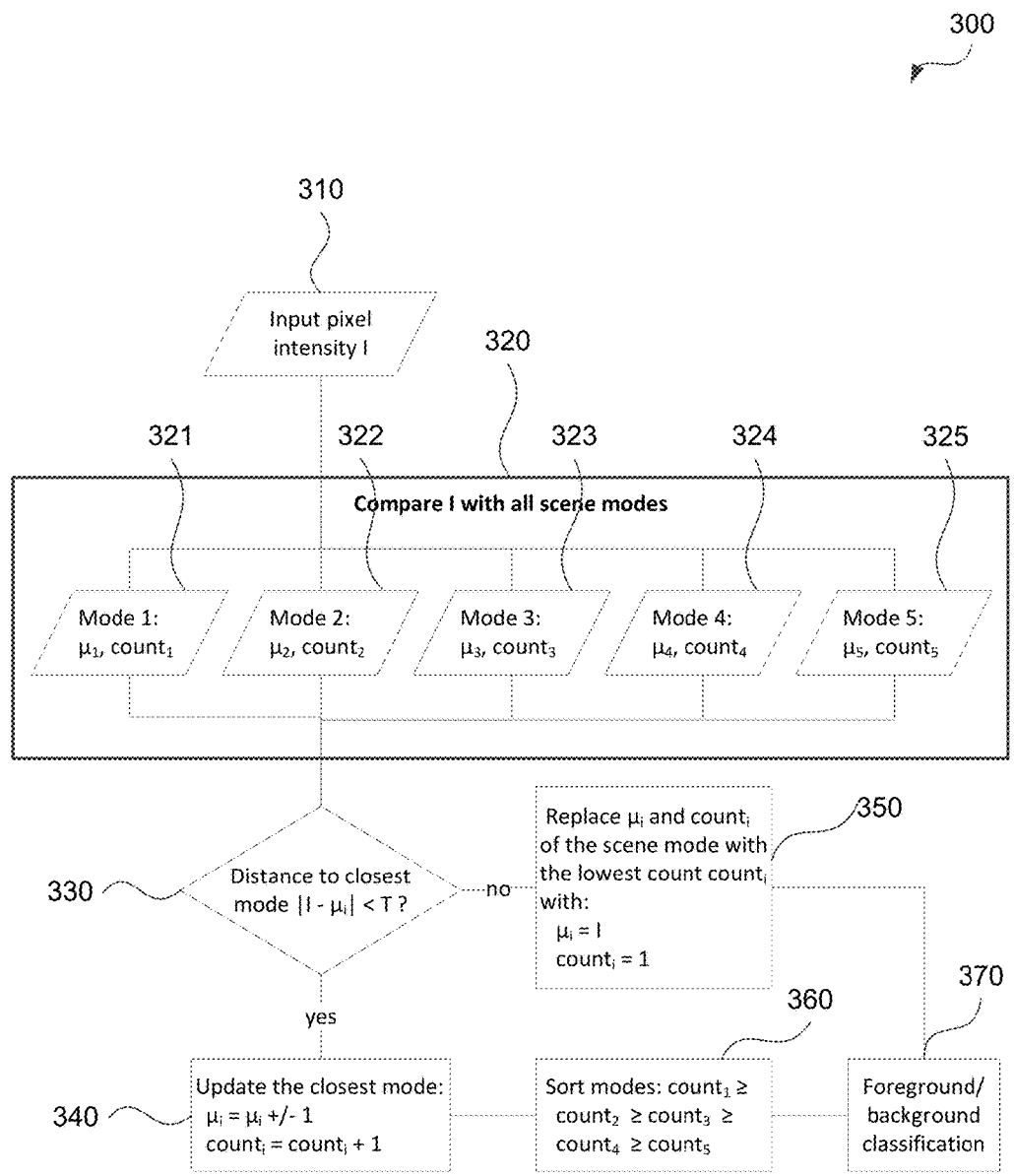
FIG. 3 is a schematic flow diagram showing a method of modelling a scene using multiple scene modes for a foreground and background segmentation of an input image.

A multi-mode scene modelling method is now described in details with reference to FIG. 3. The multi-mode scene modelling method 300 keeps multiple scene modes 321-325 per pixel. Each scene mode i contains at least an average intensity $\mu_i$ and an appearance count $count_i$. The appearance count $count_i$ is related to the mixture weight $\omega_i$ in a mixture of Gaussian modes described previously in the background section. When a new video frame is available, the method 300 is performed where the input pixel intensity I, 310, for each pixel in the video frame is matched against all scene modes 321-325 and classified as either foreground or background. The method 300 commences at step 320 where a pixel of the video frame is compared against all scene modes 321-325. The scene mode (i.e., any one of 321-325) with an average intensity $\mu_i$ closest to the input pixel intensity I is output at step 320.

The method 300 then proceeds from step 320 to 330. In step 330, the average intensity $\mu_i$ of the closest scene mode determined step 320 is compared against the input pixel intensity I. If the intensity difference $|I-\mu_i|$ is less than a predetermined change detection threshold T (YES), then the method 300 proceeds from step 330 to 340. Otherwise (NO), the method 300 proceeds from step 330 to 350. The change detection threshold T incorporates the effects of noise or gradual change in illumination in determining whether the input pixel is part of the background or foreground. For example, a value of T=20 may ignore the effects of noise or small change in illumination but still enable the decision of whether the pixel is a background or foreground.

In step 340, the average intensity $\mu_i$ of the closest mode is updated towards the input intensity I (i.e., $\mu_i=\mu_i\pm1$). At the same time, the corresponding appearance count of the closest scene mode is also incremented by one (i.e., $count_i=count_i+1$). The method 300 then proceeds from step 340 to 360.

In step 360, the scene modes 321-325 are sorted according to the number of count count of the scene modes 321-325 in a descending order. The method 300 then proceeds from step 360 to step 370.

In step 370, the scene modes 321-325 are classified as foreground or background based on appearance count $count_i$. Scene modes 321-325 which appearance counts $count_i$ are above some count threshold are classified as background, whereas scene modes 321-325 which appear less frequently are usually associated with the transient foreground. The method 300 then concludes at the conclusion of step 370.

As described above, the method 300 proceeds from step 330 to 350 if none of the average intensity $\mu_i$ of any of the scene modes 321-325 matches the input intensity I. In step 350, the average intensity $\mu_i$ of the scene mode (e.g., 321-325) with the lowest count $count_i$ is replaced by the pixel intensity I. Also, the count $count_i$ of the scene mode (e.g., 321-325) with the lowest count $count_i$ is reset to 1. The method 300 then proceeds from step 350 to step 370.

Once a background image (or a set of background images in case of a more dynamic background) is determined in step 370, foreground pixels can be detected as pixels which input intensity differs significantly from the intensity of the estimated background at the same location (or from a plurality of background intensities around the same location).

The method 300 requires high memory usage due to the storage required by the multiple intensity modes and counts. As many as five modes are required in practice, two of which to model different shades of the background (either due to dynamic texture such as swaying tree leaves or due to cast shadow), two of which to model different shades of a dominant foreground colour (e.g., lit and self-shadow parts), and one free mode for new mode swapping in and out. Despite the many modes used, the method 300 may not be able to model a continuum of intensities between two main colours. For example, the colour of soft shadow can vary continuously between a fully lit and fully shaded colour.

The computation complexity of the method 300 is also high because the input intensity I needs to be compared against the average intensity $\mu_i$ of the respective scene modes 321-325. Also, more computing and memory access is needed during the sorting of mode counts at step 360, which is necessary for mode replacement at step 350 and foreground/background classification at step 370.

To reduce computation as well as memory use, approximate median update (a.k.a. running median update) can be used rather than the weighted average update used by Mixture of Gaussians (MoG) background modelling. Approximate median update does not require floating point precision so the mode intensities and counts can be kept as integers (e.g., 8-bit unsigned integer instead of 32-bit floating point double), thereby reducing memory requirements. Mode update triggered by noise can also be reduced by only updating if the intensity difference is above a noise-level threshold: $|I-\mu_i|>\epsilon$. For example, for 8-bit unsigned integer intensities which values range from 0 to 255, $\epsilon=3$ only updates the matching mode if the intensity of the mode differs from the input intensity by more than 3 intensity level. As a result, no write access is required to update a background mode at a visual element if the visual element is not visited by a foreground object. Running median update is also more memory-efficient, requiring only two numbers $(\mu, \omega)$ to model a scene mode, compared to three numbers $(\mu, \sigma, \omega)$ per scene mode for MoG running average update.

Further reduction in computation and memory use is achievable for background modelling of specific types of scenes such as sport videos. In sport, the actions often happen on or around a sporting ground, be it a soccer field, a rugby pitch, a tennis court, a skating rink, or a ping pong table, etc. The sporting pitch usually has a distinct colour and occupies a large field of view of the camera. Players, referees, balls and other equipment are often in different colours to avoid being blended into the pitch. As a result, if an input pixel has a similar colour to the pitch, the input pixel can be assigned to a pitch mode which can be immediately classified as background. No further comparison to other scene modes is needed, resulting in a substantial reduction in computing.

Figure 4:
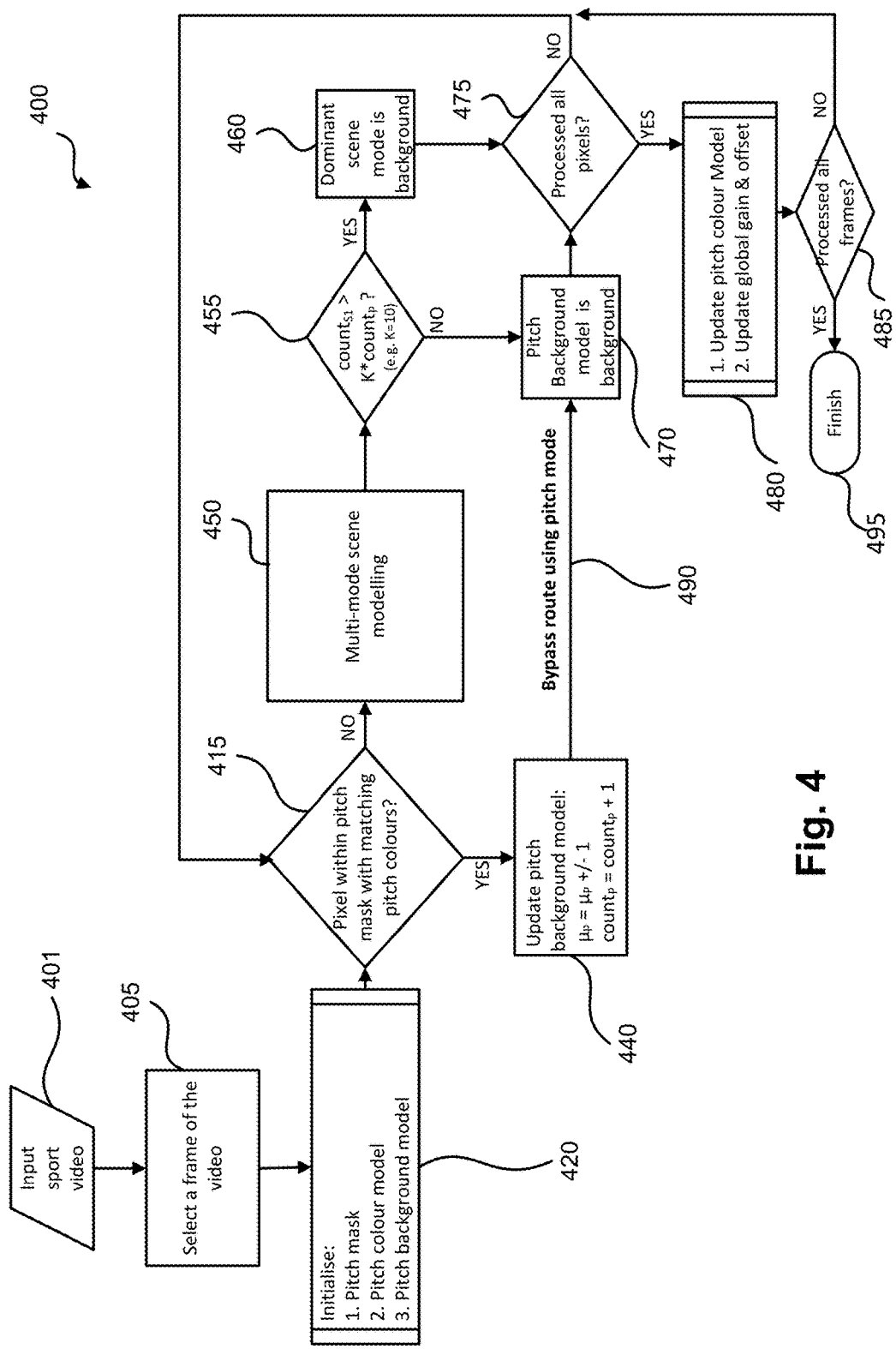
FIG. 4 is a schematic flow diagram showing a method of modelling of sporting scene using a shadow-invariant pitch background mode.

FIG. 4 shows a method 400 of background modelling of a sporting scene using a pitch background model. The method 400 commences at step 405 when an input video 401 of a sporting scene having a pitch is received. Step 405 selects a frame of the input video 401. The selected frame can be the first video frame of the input video 401, the sharpest frame, or selected randomly. The sharpest frame is a frame having the highest average image gradient energy. The image gradient energy is determined by determining the difference in intensity between adjacent pixels in a frame and averaging the intensity difference in the frame. The method 400 then proceeds from step 405 to sub-process 420.

Sub-process 420 is an initialisation step, in which the pitch in the selected video frame is segmented to output a pitch mask, a pitch colour model is determined, and a pitch background model with an average intensity $\mu_P$ is initialised at every segmented pixels with an initial count $count_P=1$. A number of scene modes with an average intensity $\mu_{Si}$ (i=1, 2, . . . ) are also created at each pixel with an appearance count initialised to zero: $count_{Si}=0$. Ideally, only pitch pixels are associated with the average intensity $\mu_P$ of the pitch background model and the pitch count $count_P$, while the remaining scene pixels are associated with any one of the average intensity $\mu_{Si}$ of the scene modes and the scene count $count_{Si}$. However, for ease of computation, all the pixels can be initialised to be associated with the average intensity $\mu_P$ of the pitch background model and the pitch count $count_P$, and the average intensity $\mu_{Si}$ of the scene modes and the scene count $count_{Si}$. If a pixel is determined not to be part of the pitch, then that pixel can be disassociated from the average intensity $\mu_P$ of the pitch background model and the pitch count $count_P$.

The sporting pitch is segmented using the selected video frame so that pixels on the pitch can be associated with the pitch background model to enable fast classification of the pixels as background pixels. The pitch segmentation results in a pitch mask that identifies which pixel is associated with the pitch and which pixel are associated with other objects (such as goal post, players, etc.).

Pitch colour model assumes the pitch to have a homogenous colour. For example, a soccer field is homogenously green. Different shades of the same pitch colour are detected to handle either a patterned pitch (e.g., striped or checker grass soccer field in two shades of green) or shadow-highlight under point source illumination. The pitch colour model includes the colour determined to be the pitch colour, other shades of the pitch colour, and a lit-shadow colour model of the pitch colour and the other shades of the pitch colour. The lit-shadow colour model provides the pitch colour and the other colour shades under different shades of shadow.

The pitch colour model can be implemented as a mixture of Gaussian colours, where each Gaussian colour describes a dominant shade of the pitch colour. The pitch colour model can be also be implemented as a binary look-up table (LUT) in a colour space such as the RGB colour space. If an RGB colour triplet is ON in the LUT, the colour is part of the pitch colour model. Otherwise, if an RGB colour triplet is OFF in the LUT, the colour is not part of the pitch colour model. A pitch colour model that covers multiple shades of the same intrinsic pitch colour (e.g. multiple shades of green grass) often populates the LUT around a lit-shadow colour line. In fact, the locus of the ON colours in an RGB LUT often forms a 3D cone, whose central axis is along the lit-shadow colour line. The tip of the cone is near the origin (R,G,B)= (0,0,0), where low brightness induces small chroma variation. As brightness increases, texture details on the pitch become more visible, leading to a larger chroma variation, hence a larger cone base.

The pitch background model is then created based on the pitch mask and the pitch colour model. That is, pixels on the detected pitch mask are associated with the pitch background model. The pitch background model is different from a normal scene mode, which models a single RGB colour. The pitch background model models a range of pitch colours (which have been estimated under different illumination conditions). The pitch background model at each pixel also has an average intensity $\mu_P$ and an appearance count $count_P$.

The sub-process 420 will be described in detail in relation to FIG. 5, which depicts the method 500 of estimating the pitch colour, shades of the pitch colour, and a lit-shadow line model of the pitch; and segmenting the pitch. That is, the method 500 is the sub-process 420. The method 400 then proceeds from the sub-process 420 to step 415.

At the output of the sub-process 420, all pixels in the selected video frame are provided to step 415. In step 415, the method 400 determines whether one of the pixels in a video frame (either the selected video frame from step 420 or any of the remaining frames from step 475) is part of the segmented pitch mask by determining whether the colour of the pixel matches one of the pitch colours in the pitch colour model.

If the pitch colour model is a mixture of Gaussian colours, the colour of the pixel needs to match at least one of the Gaussian colours to be considered a match. If the pitch colour model is a colour cone around a lit-shadow colour line, the colour of the pixel needs to fall inside the cone to be considered a match. If the pitch colour model is a colour look-up table, the colour of the pixel needs to be labelled ON by the look-up table to be considered a match.

If the pixel colour matches one of the pitch colours in the pitch colour model (YES), the method 400 proceeds from step 415 to step 440. If the pixel colour does not match one of the estimated pitch colours of the pitch colour model (NO), the method 400 proceeds from step 415 to step 450.

In step 440, the pitch background model at the current pixel is updated using running median (a.k.a. approximate median) update. In an alternative arrangement, the weighted average update is used for updating the pitch background model. The update includes incrementing or decrementing the average intensity $\mu_P$ of the pitch background model depending on whether the intensity of the current pixel is above or below the average intensity $\mu_P$, and incrementing the count $count_P$ by 1. The method 400 then proceeds from step 440 to step 470 via the bypass route 490 (highlighted in bold in FIG. 4).

In step 470, the current pixel is labelled as background. The method 400 then proceeds from step 470 to step 475 (which will be described after the description of step 470).

In step 450, the method 300 is performed such that the colour of the current pixel is used to update the multi-mode scene models as described hereinbefore. As previously described in relation to the method 300 and associated FIG. 3, the multi-mode scene modelling of the method 300 either updates a matching scene mode or replaces the least occurring scene mode if no existing matching scene mode is found. The scene models are then sorted in a descending count order for foreground/background classification purpose. The method 400 then proceeds from step 450 (i.e., the method 300) to step 455.

In the decision step 455, the method 400 determines whether the most dominant scene mode resulting from the execution of the method 300 at step 450 should be classified as background. Such a determination is based on whether the average intensity $\mu_{S1}$ of the most dominant scene mode has an appearance count $count_{S1}$ that is significantly larger than the appearance count $count_P$ of the pitch background model at the same pixel (i.e., $count_{S1} > K \times count_P$ (where K=10 for example)). K is a constant determining the threshold for the appearance count $count_{S1}$ of the most dominant scene mode before the most dominant scene mode can be considered to be the background of the video 401. K can be a value of 3 or more. The determination ensures that a long term stationary foreground object is still classified as foreground. If $count_{S1} > K \times count_P$ (YES), the method 400 proceeds from step 455 to step 460. If the average intensity $\mu_{S1}$ of the most dominant scene mode has an appearance count $count_{S1}$ that is not significantly larger than the appearance count $count_P$ of the pitch background model (i.e., $count_{S1} < K \times count_P$) (NO), the method 400 proceeds from step 455 to step 470.

In step 460, the dominant scene mode is selected to represent the colour of the background at the current pixel. The method 400 then proceeds from step 460 to step 475 (which will be described after the description of step 470).

As described hereinbefore, in step 470, the pitch background model is selected as the background colour at the current pixel. The method 400 then proceeds from step 470 to step 475.

In step 475, the method 400 determines whether all the pixels in a video frame have been processed. If there are unprocessed pixels (NO), the method 400 proceeds from step 475 to step 415. If all the pixels have been processed (YES), the method 400 proceeds from step 475 to step 480.

In step 480, the colours associated with the pitch colour model is updated. Step 480 also applies a global colour gain and offset to the pitch background model and all scene models in case of a global illumination change. Step 480 will be described further after discussing the method 500. The method 400 then proceeds from step 480 to step 485.

In step 485, the method 400 determines whether all the frames in the input video 401 have been processed. If all the frames have been processed (YES), then the method 400 concludes. If all the frames have not been processed (NO), then the method 400 proceeds from step 485 to step 415 to process the pixels in the remaining frames of the video 401.

Figure 5:
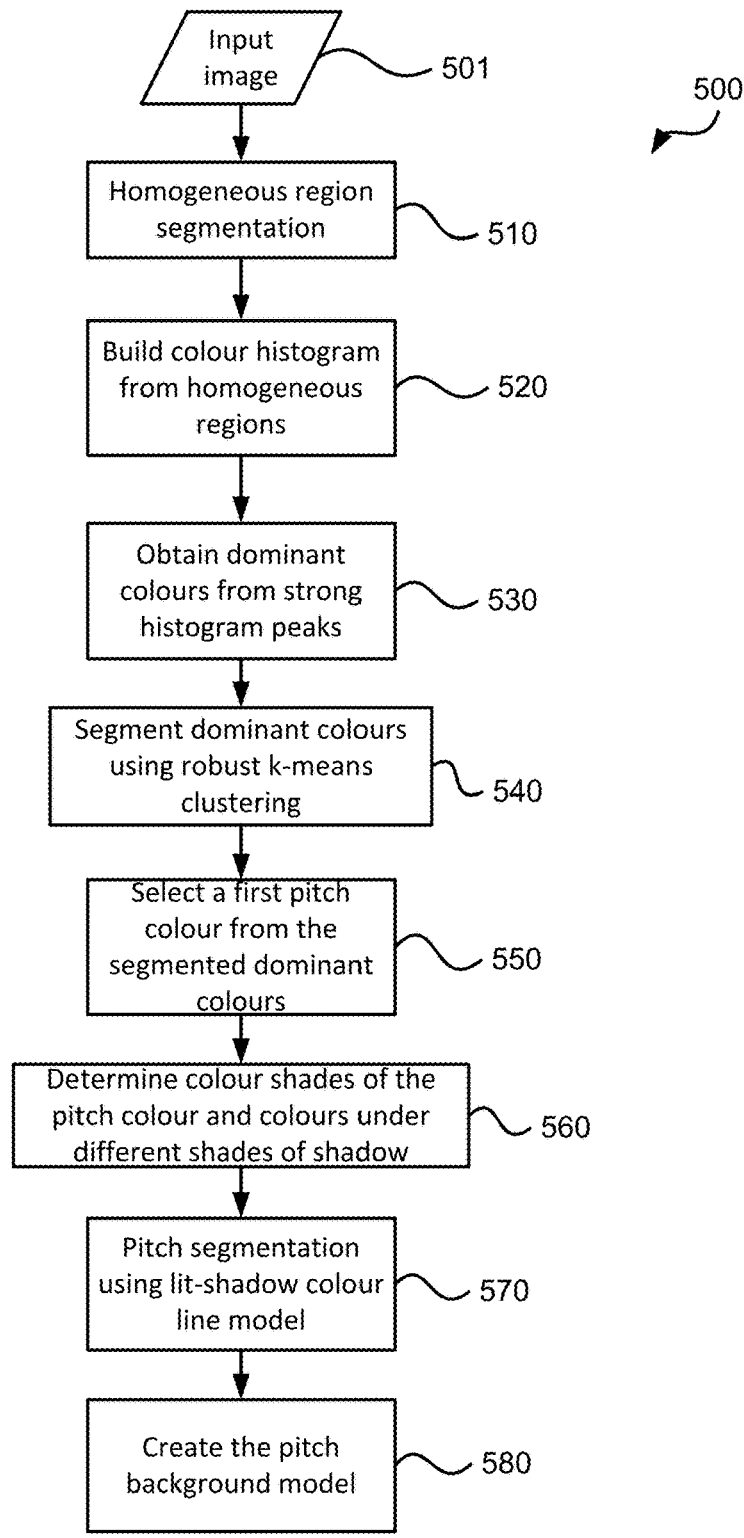
FIG. 5 is a schematic flow diagram showing a method of sporting pitch segmentation from different shades of pitch colours found in an input image.

The method 500 is performed in the sub-process 420 and is shown in FIG. 5. The method 500 relates to pitch colour estimation and pitch segmentation to generate the pitch colour model and the pitch mask, respectively. FIGS. 6, 6A, 7, and 7A illustrate examples of the pitch colour estimation and pitch segmentation performed by the method 500.

The method 500 commences at step 510 where the method 500 receives an input image 501 (which is the selected video frame of the input video 401). As the cameras 120A-120X usually focus on the game, the majority of the field of view is on the soccer field. The single-coloured soccer field in FIG. 6A appears in different colours due to the different illumination from the sun and sky. Sometimes, a patterned grass field can have two or more shades of green or a multi-colour stripe pattern due to grass mowing in different directions, which can be regarded as the same intrinsic colour seen under different illumination conditions. The dominant green pitch colour often shows up as a dominant peak in the colour histogram of the image. Since the sporting pitch is often low-textured, textured pixels in the image such as those from the spectators, stadium seatings, or banner texts can be excluded from histogram accumulation. Sporting fans are also known to wear similar colour to that of their supporting team. As a result, these textured pixels on the stadium can form a dominant colour histogram peak in direct competition with the dominant colour histogram peak of the pitch. A normalised texture measure is used to differentiate low-contrast textured pixels in poorly lit stadium seating regions from similarly low-contrast textured pixels of the grassy pitch under brighter illumination. The normalised texture measure $msr_t$ is computed at every pixel over a small neighbourhood S (e.g., 9×9 pixels)

$$msr_t = \frac{\max_S(I) - \min_S(I)}{\max_S(I) + \min_S(I)} \tag{3}$$

where $\max_S(I)$ and $\min_S(I)$ are the local maximum and minimum of image intensity I over a neighbourhood S. Note that the normalised texture measure ranges from 0 (flat intensity) to 1 (maximum local variation). Step 510 segments an input image 501 into homogeneous regions, which pixels have normalised texture measure $msr_t$ lower than a certain threshold (e.g., 0.1). In an alternative arrangement, the homogeneous region can be determined using methods such as normalised variance, normalised standard deviation. The method 500 then proceeds from step 510 to step 520.

Step 520 then builds a colour histogram from the segmented homogeneous regions. The colours of low-textured pixels are used to accumulate a colour histogram in a metric colour space like CIELab. In open-area sport like soccer or rugby, colours can be gathered from pixels at the bottom half of the image to avoid sampling the sky or stadium colours. In other close-space sport like table tennis or wrestling, colours can be sampled from an inclusion mask of where the pitch may be. CIELab is a metric colour space because the Euclidean distance between two colours $d(Lab_2,Lab_2)=\sqrt{(L_1-L_2)^2+(a_1-a_2)^2+(b_1-b_2)^2}$ is proportional to the perceived colour difference, where L is the luminance component and a and b are two chrominance components. A colour space that separates the luminance from the chrominance minimises cross-channel correlation. The RGB channels are not preferred as the RGB channels are highly correlated, which is not good for Euclidean distance. The luminance channel can be scaled separately to bring different shades of the same colour closer to each other, hence more robust to illumination changes. However, the conversion from RGB to CIELab is rather expensive. For a more computational efficient method, a modified YCbCr colour space can be used, where the luminance channel Y is reduced by a factor of 2.5 (Y'=Y/2.5) to make the YCbCr colour space more isometric. The metric Y'CbCr colour space is useful for a k-means clustering procedure (described hereinafter). These modified Y'CbCr values are then used to accumulate a 32×32×32 histogram with an appropriate bin width to capture the majority of the colour channels' dynamic range. The method 500 then proceeds from step 520 to step 530.

Step 530 obtains dominant colours from strong colour histogram peaks. Colour histogram peaks are detected over a local 3×3×3 neighbourhood with subpixel localisation. Dominant colours are selected from peaks with strong histogram counts (e.g., count >sqrt(N)/2, where N is the number of pixels in the image, and sqrt(N) is the square root of N). The method 500 then proceeds from step 530 to step 540.

Step 540 then segments the homogeneous regions of the input image 501 into segments of dominant colours using a robust k-means clustering algorithm using the obtained dominant colours as k initial mean (i.e. average) colours. k-means clustering iteratively refines both k dominant colours as well as the colour segmentation. Different from a traditional k-means clustering algorithm, which associates every image pixel to a closest mean colour, the robust k-means algorithm drops the associations if the colour distance to the closest mean colour exceeds a certain threshold. The threshold is determined based on distance between the respective dominant colour and the closest mean colour such that the threshold value increases with increasing distance. The robust k-means clustering algorithm still segments the input image into k coloured segments, but some pixels are not given a label because their colours are too different (i.e., the distance between the pixel colour and the closest mean colour is greater than the threshold) from all k mean colours.

Figure 6A:
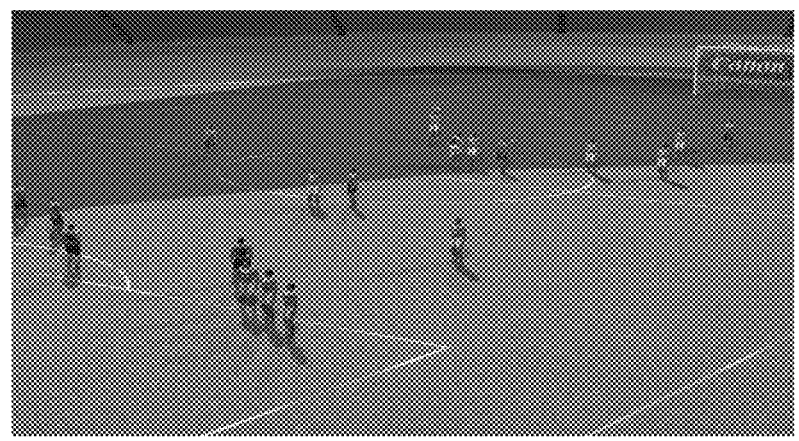
FIG. 6A shows an example image of a sporting scene in which the sporting pitch has large areas of pixels under different shades of shadow.
Figure 6B:
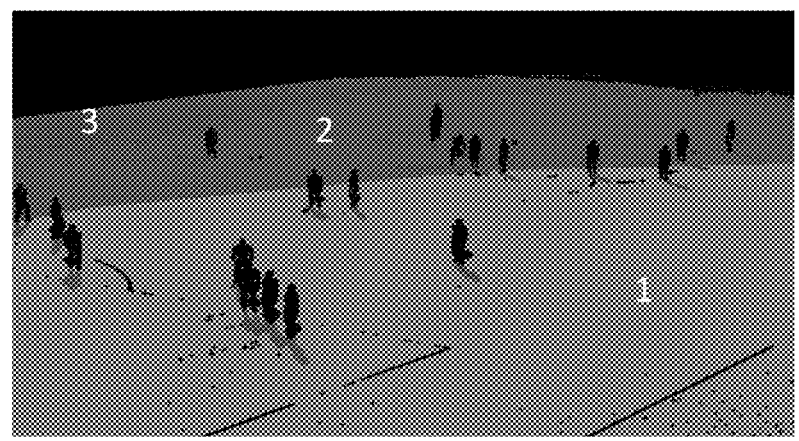
FIG. 6B shows a segmentation of the image in FIG. 6A into large regions of uniform colours, where each colour is a different shade of the same pitch surface.

An example of robust k-means segmentation is given in FIG. 6B, where each shade of grey corresponds to a homogeneous segment of a single colour. The black pixels are outliers that are not associated with any dominant colours. The segmented dominant colours in FIG. 6B correspond to colours of the pitch under different amounts of shading. The outliers are pixels having non-dominant colours in the input image in FIG. 6A, which includes pixels from line markings and players in different clothing colours than the pitch colours.

The method 500 then proceeds from step 540 to step 550.

Figure 7A:
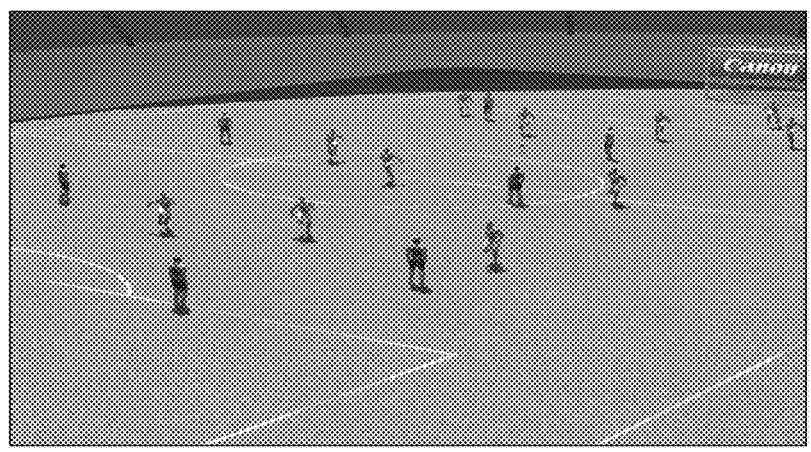
FIG. 7A shows another example image of a sporting scene in which the majority of the sporting pitch is under one shade of shadow.
Figure 7B:
FIG. 7B shows a segmentation of the image in FIG. 7A into a single region of uniform colour, which is the dominant shade of shadow of the pitch surface.

Step 550 then selects a first pitch colour based on the most dominant colours determined from step 540. That is, the dominant colour with the largest number of associated pixels is selected to be the first pitch colour. The reason for doing so is because the largest dominant colour is likely to come from the pitch as textured pixels, potential sky, and spectator pixels have been excluded from dominant colour segmentation by previous steps 510 to 530. In the case where there is prior knowledge on the pitch colour (e.g., blue instead of green), or the pitch location within the frame (e.g., in the middle of the frame instead of at the bottom), the prior knowledge could be used to select the first pitch colour. For example, if there is prior knowledge that the pitch is blue, then the colour blue with the largest segment is selected to be the first pitch colour. In FIG. 6B, from four detected dominant colours, the darkest colour corresponding to the pitch in full shade was selected as the most dominant colour. In FIG. 7B, where only one dominant colour was detected, the dominant colour is selected as the colour of the pitch. The method 500 then proceeds from step 550 to step 560.

Step 560 finds other shades of the pitch colour if such colour shades exist in the input image 501. The first place to look for other shades of the pitch colour is in the segmented dominant colours (i.e., the output of step 540). Two colours are different shades of the same colour, if the two colours satisfy the weak shadow colour model presented previously in equations (1) and (2). In other words, two compatible colours must have similar chromatic components while the luminance ratio is within a certain range (e.g., 0.25 to 4). The colour segments with different shades must also be adjacent to the initial pitch colour segment to be grouped as coming from the same pitch. Segments are considered to be adjacent if the shortest distance between pixels from different segments is less than or equal to a radius r. For example, r=5 pixels allow a gap of maximum 5-pixel wide between the segments, usually enough to handle line marking or a region of smooth colour transition between the two segments. The dominant colour segments in FIG. 6B, for example, are all adjacent, according to this definition, either directly or via a common adjacent segment.

Figure 7C:
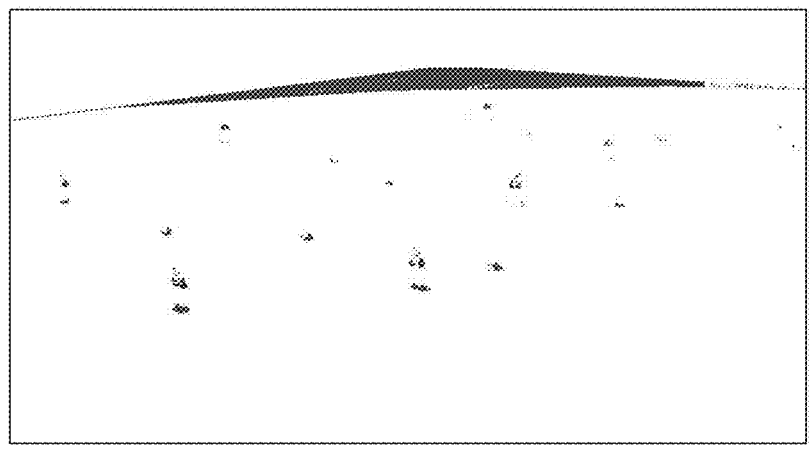
FIG. 7C shows a detection of pitch colour matching pixels from pixels outside the dominant pitch segmentation in FIG. 7B.

In the case where no other shade of the dominant colour is found or adjacent to the initial pitch segment, other shades of the pitch colour may be found from the outlier pixels from robust k-means clustering. Shadow pixels, for example, do exist in FIG. 7A but they appear in small quantity so their colours are not picked up by the dominant colour segmentation in step 540. For such cases, a pitch-compatible colour is found from the non-dominant coloured pixels inside the convex hull of the initial pitch segment. A second colour histogram is built from these outlier pixels, and non-dominant colours are selected from the histogram peaks similar to the selection of the dominant colours in steps 520-540. FIG. 7C shows an example of shadow colour detection from the non-dominant coloured pixels inside the convex hull of the initial pitch segment in FIG. 7B. Note that both large fixed shadow and small moving shadow patches were successfully recovered.

Generation of a lit-shadow colour model is now described. The lit-shadow colour model enables chromatic shift of outdoor scene where the lit colour (which colour is reddish from the sun) and the shadow colour (which colour is bluish from the sky illumination) is taken into account. On the other hand, a weak shadow colour model assumes that the shadow colour is a darker version of the colour and therefore does not take into account the chromatic shift between the lit colour and the shadow colour. The lit-shadow colour model therefore provides a shadow-invariant detection of pitch colours.

Figure 6C:
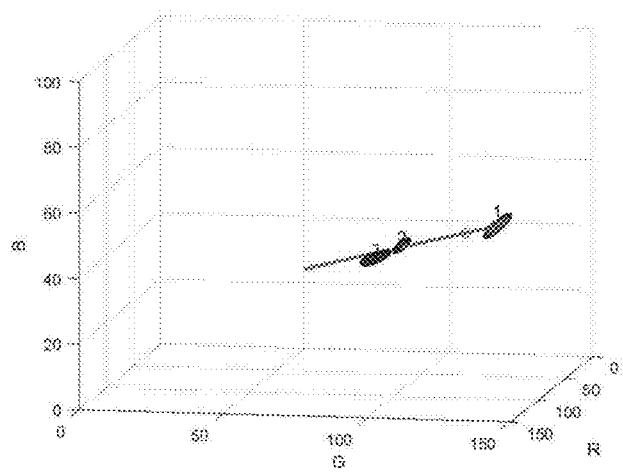
FIG. 6C shows a three-dimensional colour line passing through the different shades of pitch colours shown in FIG. 6B.

The multiple shades of the pitch colour under different amount of shadow in FIG. 6B are represented as ellipsoid in FIG. 6C. The ellipsoids form a straight line in the RGB colour space as shown in FIG. 6C. This is because each shade of shadow is a linear combination of the colour reflectance due to the sun alone and colour reflectance due to the sky alone. Each ellipsoid in FIG. 6C is centred at a dominant RGB colour in FIG. 6B. The ellipsoid marked as 1 has pixels with the darkest shade of colour, while the ellipsoid marked as 4 has pixels corresponding to the brightest part of the pitch. The size and shape of the ellipsoid represents the 3×3 covariance matrix of colours sampled from each dominant colour segment. Note that the fitted red line through the four ellipsoids does not go through the origin. There is a chromatic shift between the lit and shadow colours. This chromatic shift is due to the different colours of the sun and sky illumination: the sun has a warmer colour (i.e. more red than blue) than that of the sky. Thus, the lit-shadow colour model allows a chromatic shift between the colours under different illumination.

Figure 8A:
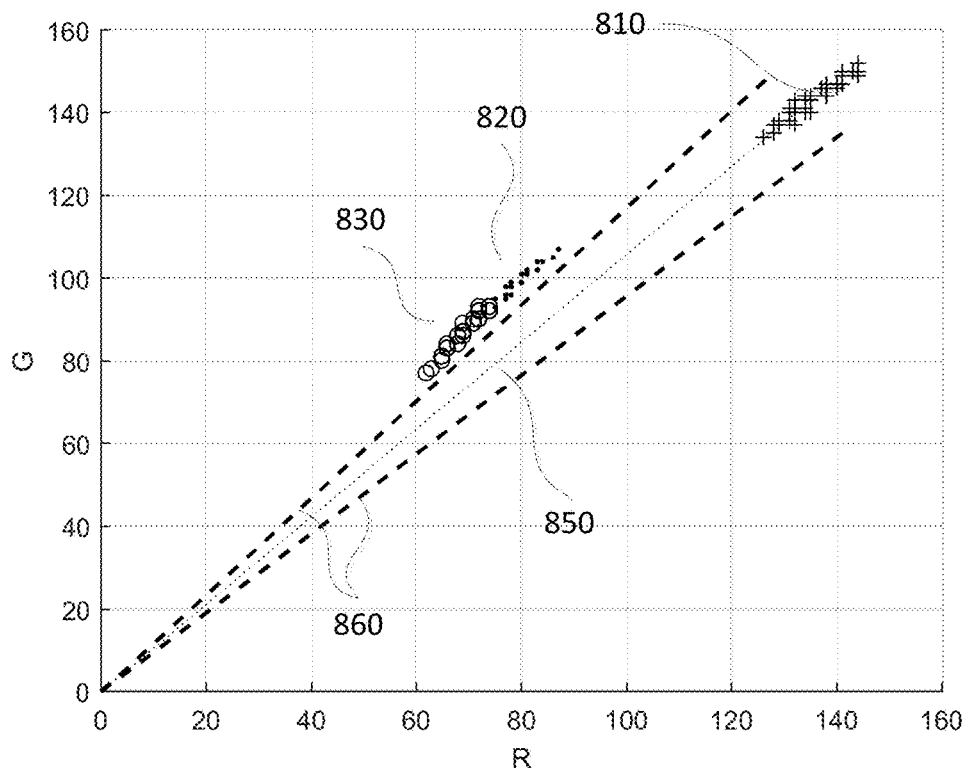
FIG. 8A shows a weak shadow classifier on top of a scatterplot of the red-green colours of the segmented pitch pixels in FIG. 6B.
Figure 8B:
FIG. 8B shows a pitch colour classification result of the image in FIG. 6A using the weak shadow classifier in FIG. 8A.

Because shadow colours are not simply a darker version of the sun-lit colour, the weak shadow colour model is not the best way to model shadow colours. FIGS. 8A, 8B, 9A and 9B illustrate that shadow modelling along a scene-dependent lit-shadow colour line is better than the line connecting the lit colour and the origin as used by the weak shadow model. FIG. 8A shows a scatter plot of the R-G colours of pixels of the image in FIG. 6A. Three clusters 810-830 corresponding to 3 detected dominant colours are shown in different markers. A line 850 is drawn between the average colour of the lit colour cluster 810 and the origin. A colour cone 860 around the line 850 defines a shadow classifier defined by the weak shadow model. Note that many pixels in full shade from cluster 830 lie outside this weak shadow classifier cone. As a result, the pitch colour detection result in FIG. 8B only detects fully lit pixels. A majority of the pitch under full shade is not detected by the weak shadow model. Although the opening angle of the shadow cone (0.1 radian=5.7°) could be enlarged to accept more shadow pixels, this would increase the false detection rate.

Figure 9A:
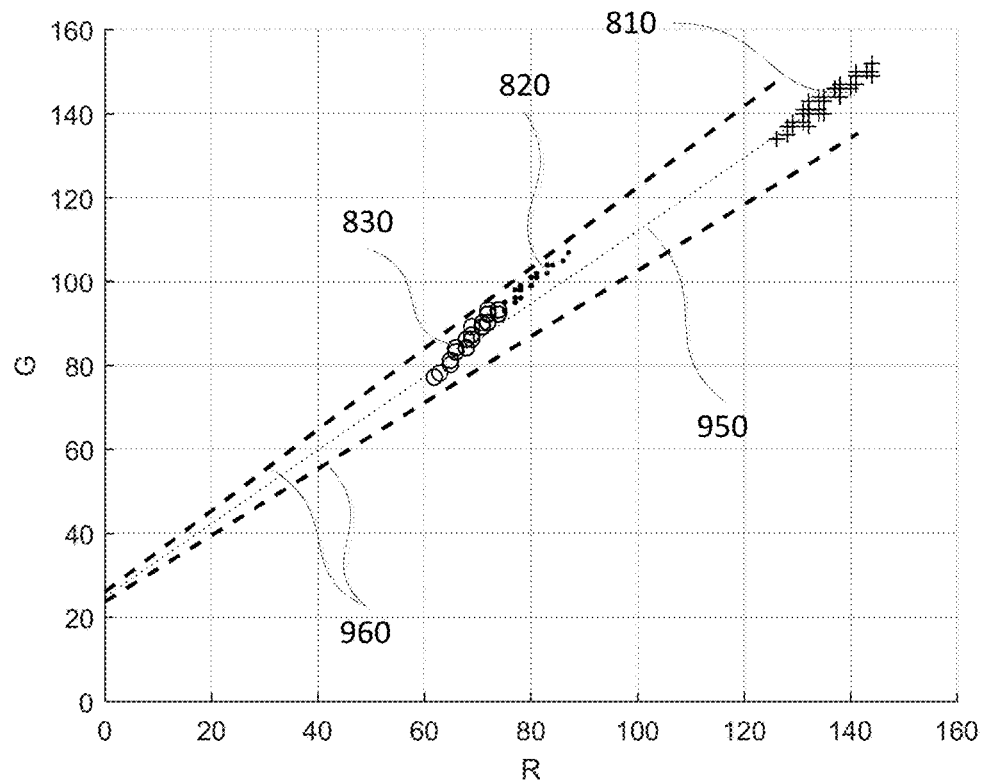
FIG. 9A shows a lit-shadow colour line classifier on top of a scatterplot of the red-green colours of the segmented pitch pixels in FIG. 6B.
Figure 9B:
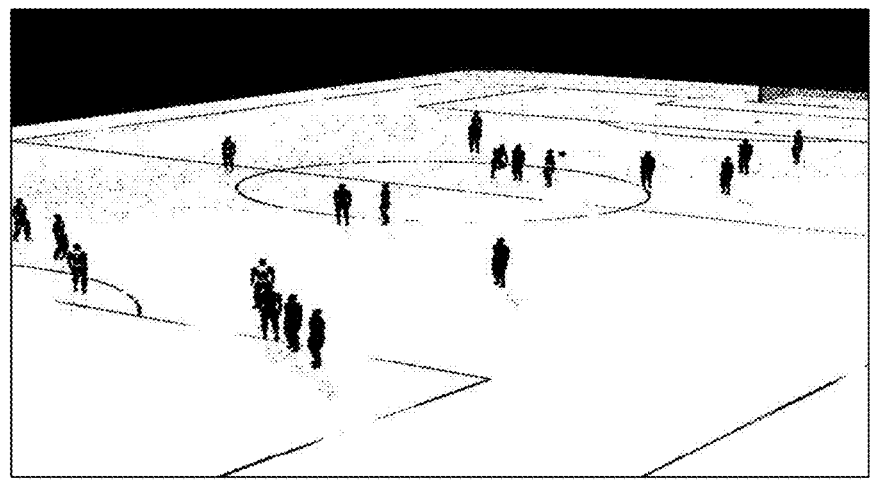
FIG. 9B shows a pitch colour classification result of the image in FIG. 6A using the lit-shadow colour line classifier in FIG. 9A.

Aligning the shadow detection cone along a scene-dependent lit-shadow colour line instead of a line through the origin can improve colour-based pitch detection result and shadow detection. FIG. 9A shows the same colour clusters 810-830 lying on a lit-shadow colour line 950 that does not go through the origin. A colour cone 960 around this lit-shadow colour line 950 with the same opening angle as in FIG. 8A (0.1 radian) comfortably accommodates all three colour clusters. Unlike FIG. 8A, the tip of the cone is not at the origin but at the projection of the origin on to the lit-shadow colour line 950. Pitch detection result in FIG. 9B confirms that all shades of pitch colours are detected by the lit-shadow colour cone 960, while other colours from line markings, soccer players, goal post and background stadium are not detected. In fact, the pitch colour detection result in FIG. 9B is good enough for foreground player segmentation if the players are fully inside the pitch mask.

The classification cone of the weak shadow model and the lit-shadow colour model results from an observation that colour variation is smaller for within a darker colour patch compared to that of a brighter colour patch. This could be due to the luminance-dependent photon shot noise (i.e. Poisson noise), but it most likely comes from the surface texture, which variation is proportional to the incident illumination. The classification cone angle can therefore be determined automatically from the colour variation of the detected dominant pitch colours. FIG. 9A shows a tight fit of the colour classification cones to all colour clusters. The tight fit ensures that all pitch-coloured pixels in the selected video frame are correctly classified as pitch, at the same time minimises false detection rate of close colours from non-pitch pixels. Therefore, the pitch colour model is generated at the conclusion of step 560 by including the first pitch colour (determined at step 550), all colour shades of the first pitch colour, as well as the pitch colour and the colour shades under different shades of shadow, where colours under the different shades of shadow are determined by the lit-shadow colour model. The pitch colour model therefore provides a shadow-invariant detection of the pitch. Shadow on the pitch can also be detected using the lit-shadow colour model. The method 500 then proceeds from step 560 to step 570.

In step 570, the method 500 segments the pitch to produce a pitch mask that is used by the sport scene modelling method 400. The pitch mask covers all detected pitch colour pixels as defined in the pitch colour model as well as pixels occupied by moving foreground objects in the selected frame. This pitch mask can be obtained as a convex hull of the detected pitch colour pixels because a sporting pitch often has a convex 2D shape. The pitch mask should be verified over multiple frames during an initial training period if necessary. The method 500 then proceeds from step 570 to step 580.

In step 580, a pitch background model is created based on the pitch colour model and the pitch mask. As previously explained in relation to FIG. 4, the pitch background model is created for pixels inside the pitch mask. The pitch background model also takes precedence over normal scene mode during background classification. An existing pitch background model with fewer appearance count than a scene mode can still be classified as background in step 455. This should only be true for pixels on the pitch so that when spectators on the stadium wear a similar colour to the pitch, the spectators will not be classified as background.

The components of the pitch background model can be extended to handle sporting pitch that contains more than one dominant colour. For example, line markings can be modelled explicitly by another lit-shadow colour model. Line markings can be detected after an initial segmentation of the dominant pitch colour at step 540. Elongated gaps in the initial pitch segmentation with consistent widths and a high contrast (e.g. white or yellow) underlying colour are often part of the line markings. However, a new pitch background model should only be created if another colour covers a significant number of pixels (e.g., greater than 20%) on the pitch for efficiency purpose. The method 500 then concludes at the conclusion of step 580.

The discussion now turns back to the method 400. Once all the pixels in a frame of the video 401 have been processed, the method 400 proceeds to step 480 as described hereinbefore. The global scene model update step 480 is now described in further details. The purpose of step 480 is to update the pitch colour model, the pitch background model and other scene models to handle global illumination changes. During the course of a sporting match over several hours, the sun elevation can change noticeably, leading to a gradual change in global illumination. In fact, an outdoor match can start during the day with sun illumination and end in the evening with fluorescent flood light illumination. In many instances, the global illumination can change even quicker due to moving clouds, aeroplanes flying overhead or birds blocking flood light. If the scene models do not quickly adapt to the global illumination changes, spurious foreground detection can occur.

Although the global update step 480 is shown in method 400 to be performed after every frame, the step 480 can be executed after some frames to reduce computation. Once all pixels in the image 401 is processed by the previous steps, a 3D line fit is applied to the RGB colours of pitch-matching input pixels inside the pitch mask. Alternatively, a robust line fit can be applied to the RGB colours of all pixels inside the pitch mask. Assuming a low percentage of foreground pixels inside the pitch mask, the robust line fit can correctly reject these foreground colours as outliers. This line fit can be used as the pitch colour model in the next video frame. The gain and offset that shift the pitch colour model from one frame to the next is the respective global gain and offset due to illumination changes. This global gain and offset is applied to all scene modes to reflect the changes in illumination. The method 400 then proceeds from step 480 to step 485, which is described hereinbefore.

As described hereinbefore, the method 400 determines in step 485 whether all the frames in the input video 401 have been processed. If all the frames have been processed (YES), then the method 400 concludes. If all the frames have not been processed (NO), then the method 400 proceeds from step 485 to step 415 to process the pixels in the remaining frames of the video 401.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of classifying foreground and background in an image of a video, said method comprising:
   determining a pitch colour model of the image, the pitch colour model comprising a pitch colour, colour shades of the pitch colour, and the pitch colour and the colour shades under different shades of shadow;
   determining a pitch mask based on a pitch segmentation of the image of the video;
   determining a pitch background model based on the pitch mask and the pitch colour model;
   classifying each of the elements of the pitch mask as background if a colour of the element of the pitch mask matches the pitch colour model; and
   updating the pitch background model and the pitch colour model using the colours of the elements that have been classified to match the pitch colour model.

2. The method according to claim 1, further comprising:
   classifying each of the elements of the pitch mask as either foreground or background using a multi-mode scene modelling if the element of the pitch mask does not match the pitch colour model; and
   updating the multi-mode scene modelling.

3. The method according to claim 1, wherein the pitch colour model allows a chromatic shift between the colours under different illumination.

4. The method according to claim 1, wherein the pitch colour and the colour shades under different shades of shadow of the pitch colour model are determined by a lit-shadow colour model.

5. The method according to claim 4, wherein the lit-shadow colour model is determined by using a line fitting the pitch colour and the colour shades under different shades of shadow in a colour space.

6. The method according to claim 4, further comprising detecting shadow in the image using a background image and the lit-shadow colour model.

7. The method according to claim 1, wherein the pitch colour model is a colour cone with an axis along a lit-shadow colour line.

8. The method according to claim 1, wherein the pitch colour model is a look-up table in a colour space.

9. The method according to claim 1, wherein changes in the updated pitch colour model is applied to the pitch background model and all the scene models of the multi-mode scene modelling to handle global illumination changes.

10. The method according to claim 1, wherein the image with classified foreground and background are used to synthesize images as seen by a virtual camera viewpoint.

11. The method according to claim 10, wherein the synthesized images are combined with other synthesized images to generate a free viewpoint video.

12. The method according to claim 1, further comprising:
    segmenting the image to determine homogenous regions in the image;
    building colour histograms from the homogeneous regions;
    obtaining dominant colours from the colour histograms; and
    segmenting the dominant colours using robust k-means clustering, wherein the segmented dominant colours are used in the determining of the pitch colour model.

13. An apparatus of classifying foreground and background in an image of a video, the apparatus comprising:
    a processor;
    a memory coupled to the processor, the memory storing instructions for execution by the processor to perform the steps of:
    determining a pitch colour model of the image, the pitch colour model comprising a pitch colour, colour shades of the pitch colour, and the pitch colour and the colour shades under different shades of shadow;
    determining a pitch mask based on a pitch segmentation of the image of the video;
    determining a pitch background model based on the pitch mask and the pitch colour model;
    classifying each of the elements of the pitch mask as background if a colour of the element of the pitch mask matches the pitch colour model; and
    updating the pitch background model and the pitch colour model using the colours of the elements that have been classified to match the pitch colour model.

14. The apparatus according to claim 13, wherein the processor further performs the steps of:
    classifying each of the elements of the pitch mask as either foreground or background using a multi-mode scene modelling if the element of the pitch mask does not match the pitch colour model; and
    updating the multi-mode scene modelling.

15. The apparatus according to claim 13, wherein the pitch colour model allows a chromatic shift between the colours under different illumination.

16. The apparatus according to claim 13, wherein the pitch colour and the colour shades under different shades of shadow of the pitch colour model are determined by a lit-shadow colour model.

17. The apparatus according to claim 16, wherein the lit-shadow colour model is determined by using a line fitting the pitch colour and the colour shades under different shades of shadow in a colour space.

18. The apparatus according to claim 13, wherein changes in the updated pitch colour model is applied to the pitch background model and all the scene models of the multi-mode scene modelling to handle global illumination changes.

19. The apparatus according to claim 13, wherein the processor further performs the steps of:

segmenting the image to determine homogenous regions in the image;

building colour histograms from the homogeneous regions;

obtaining dominant colours from the colour histograms; and segmenting the dominant colours using robust k-means clustering, wherein the segmented dominant colours are used in the determining of the pitch colour model.

20. A non-transitory computer readable medium comprising a computer program stored on the medium for classifying foreground and background in an image of a video, the computer program comprising:

code for determining a pitch colour model of the image, the pitch colour model comprising a pitch colour, colour shades of the pitch colour, and the pitch colour and the colour shades under different shades of shadow;

code for determining a pitch mask based on a pitch segmentation of the image of the video;

code for determining a pitch background model based on the pitch mask and the pitch colour model;

code for classifying each of the elements of the pitch mask as background if a colour of the element of the pitch mask matches the pitch colour model; and code for updating the pitch background model and the pitch colour model using the colours of the elements that have been classified to match the pitch colour model.

\* \* \* \* \*